Jan. 5, 1932.  H. A. FOOTHORAP  1,839,211
ADDING AND SUBTRACTING REGISTER
Filed May 3, 1924   6 Sheets-Sheet 1

Inventor,
Harry A. Foothorap.
Attorney

Jan. 5, 1932.　　　H. A. FOOTHORAP　　　1,839,211
ADDING AND SUBTRACTING REGISTER
Filed May 3, 1924　　6 Sheets-Sheet 2

Inventor,
Harry A. Foothorap.
By
Attorney

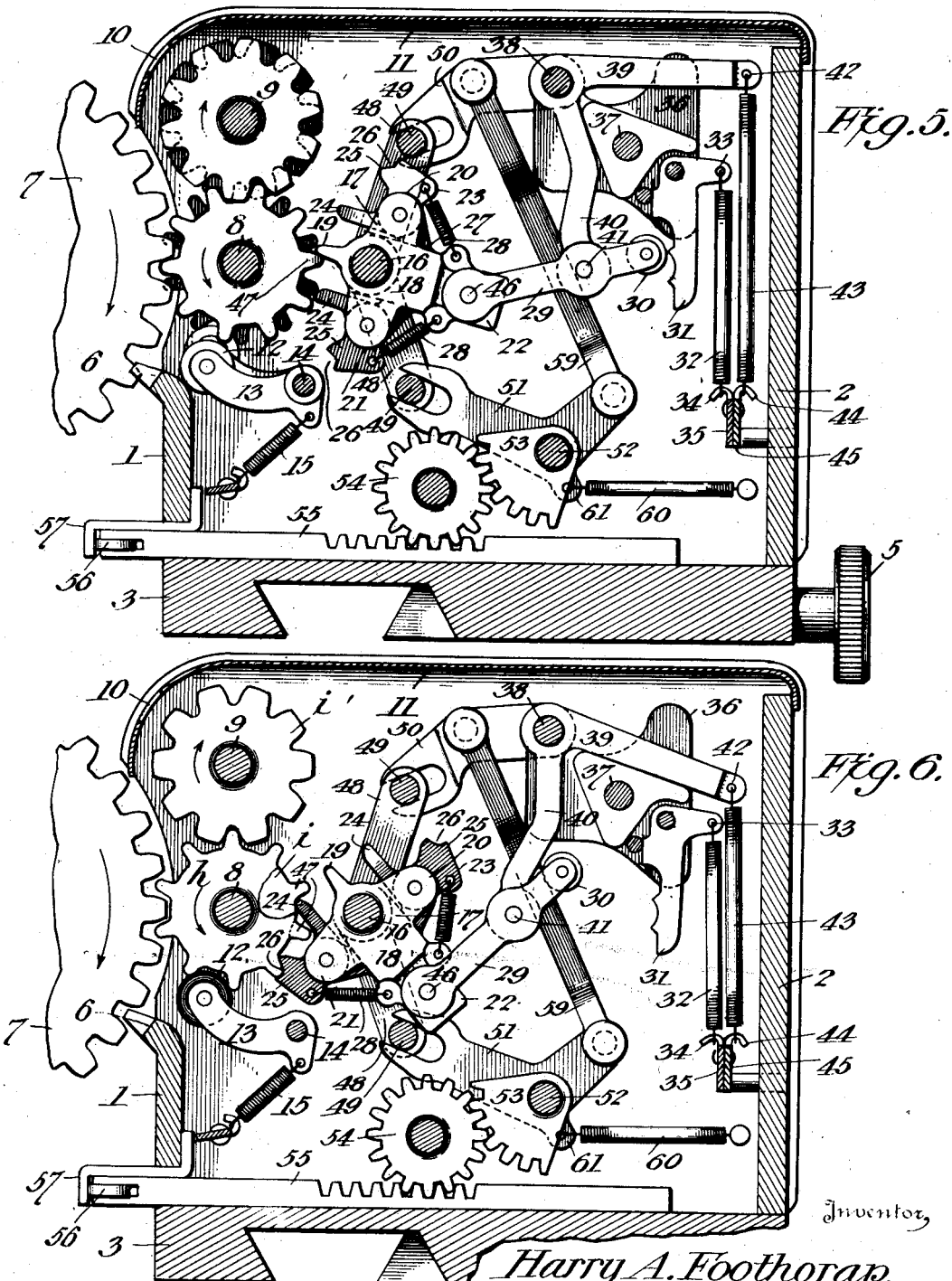

Jan. 5, 1932.     H. A. FOOTHORAP     1,839,211
ADDING AND SUBTRACTING REGISTER
Filed May 3, 1924     6 Sheets-Sheet 4
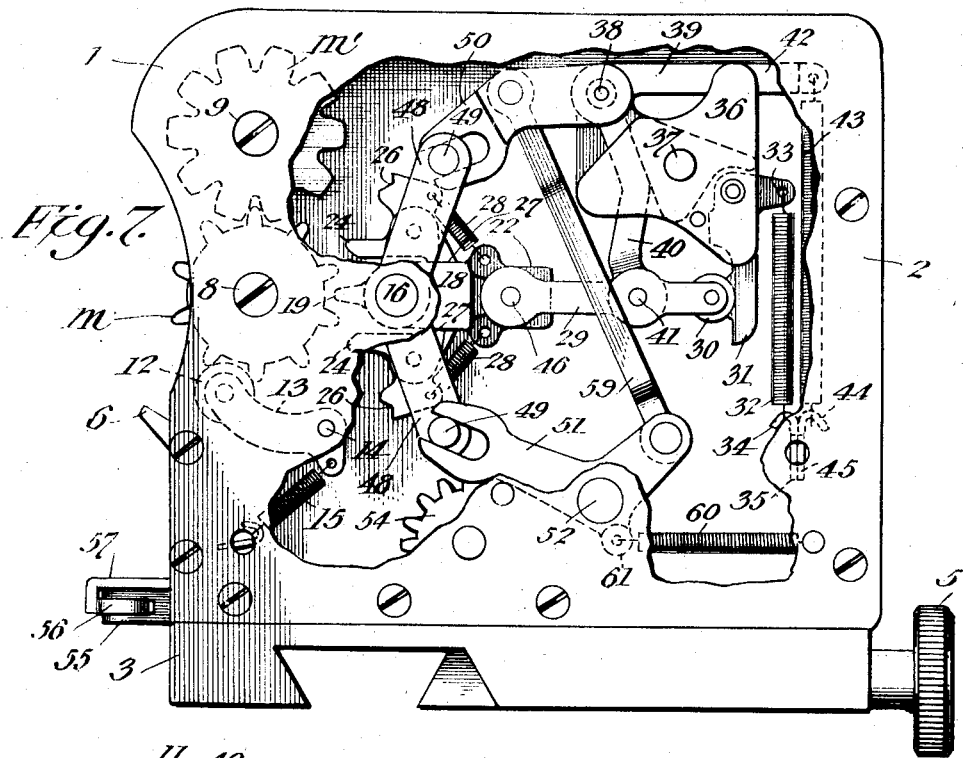
Fig. 7.
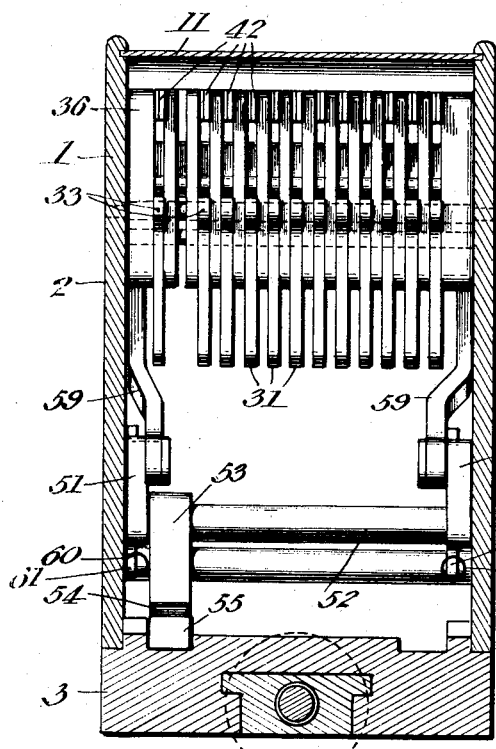
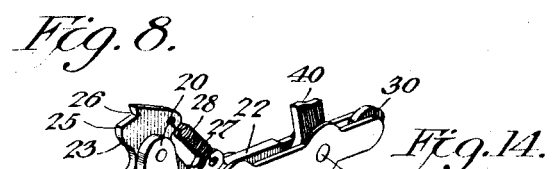
Fig. 8.
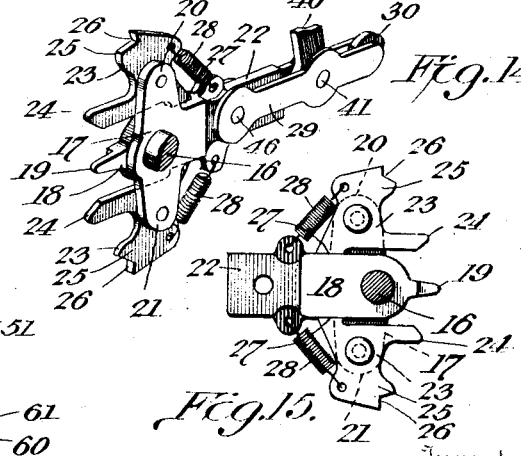
Fig. 14.
Fig. 15.
Inventor,
Harry A. Foothorap.
Attorney

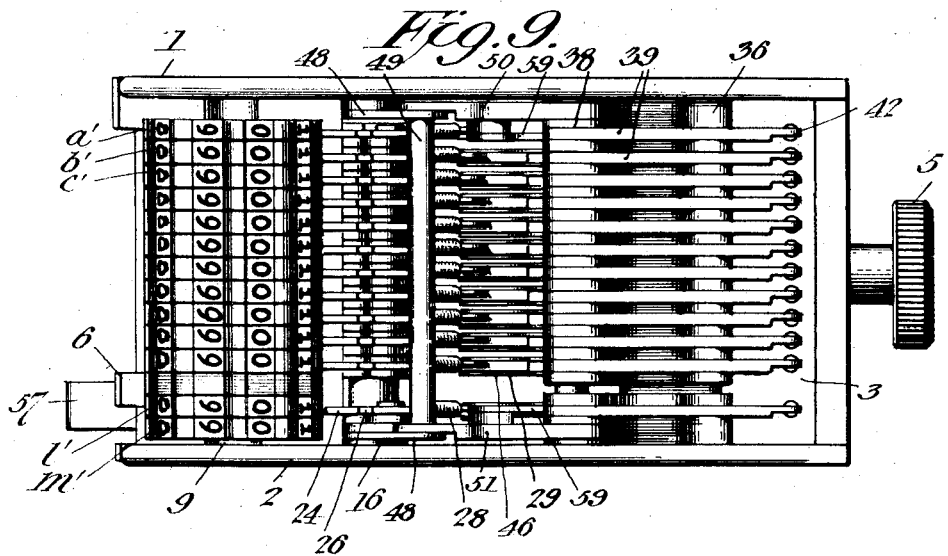
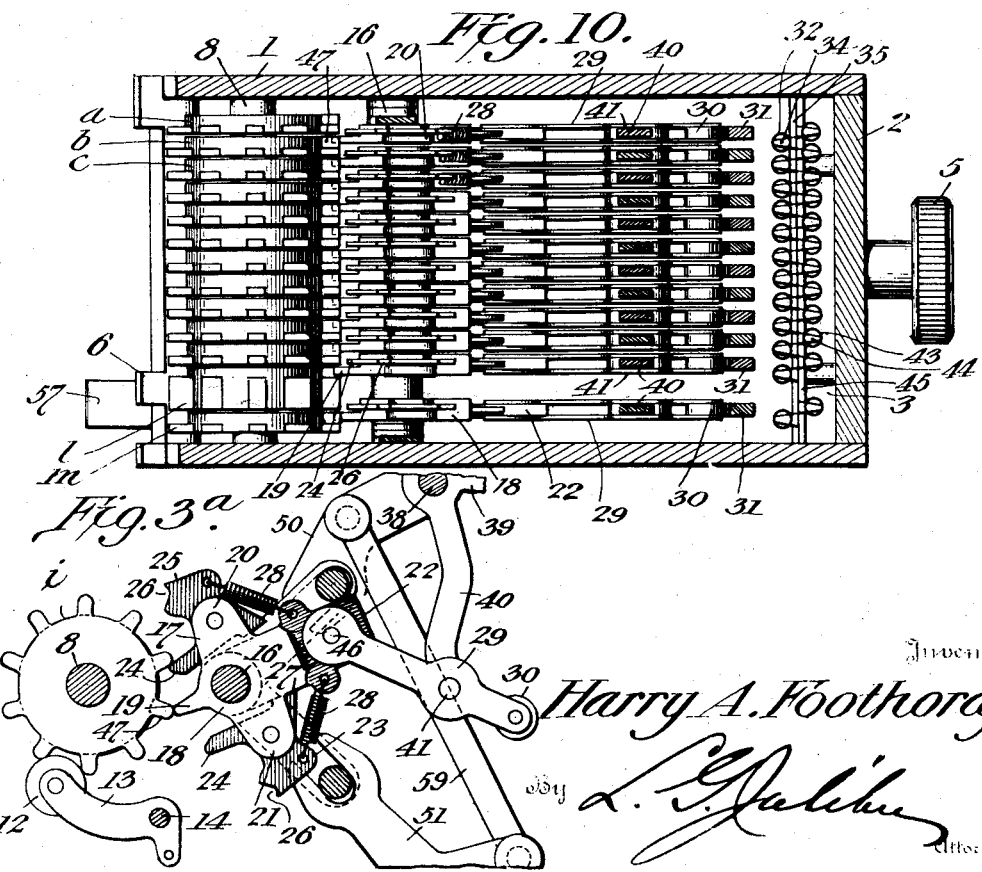

Jan. 5, 1932.    H. A. FOOTHORAP    1,839,211
ADDING AND SUBTRACTING REGISTER
Filed May 3, 1924    6 Sheets-Sheet 6
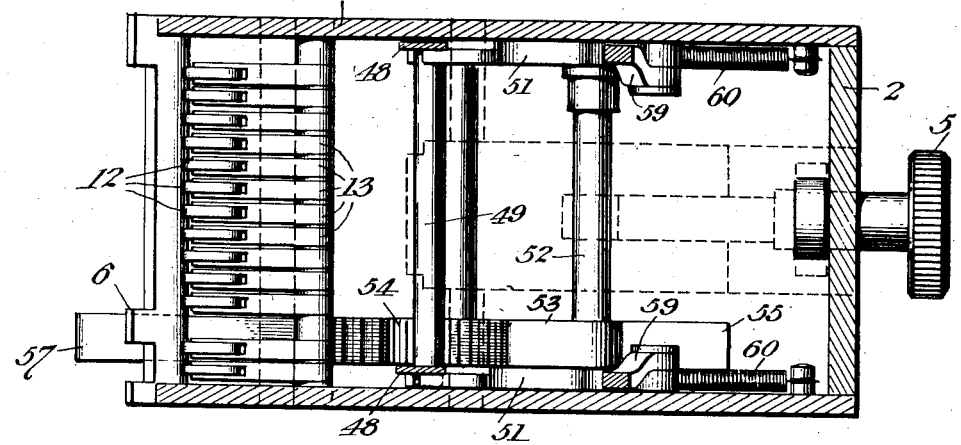
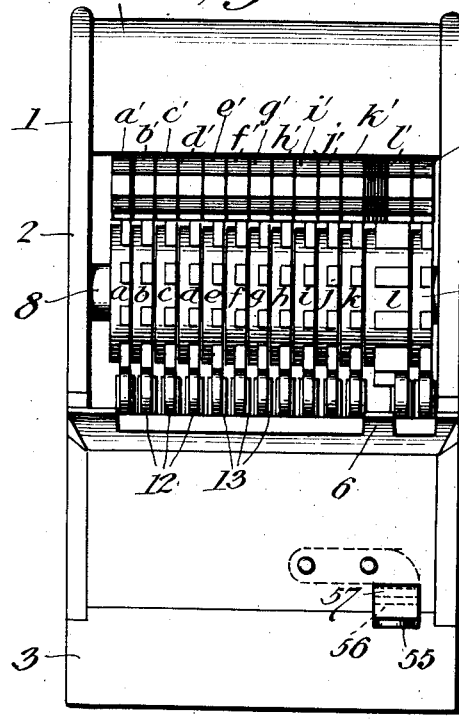
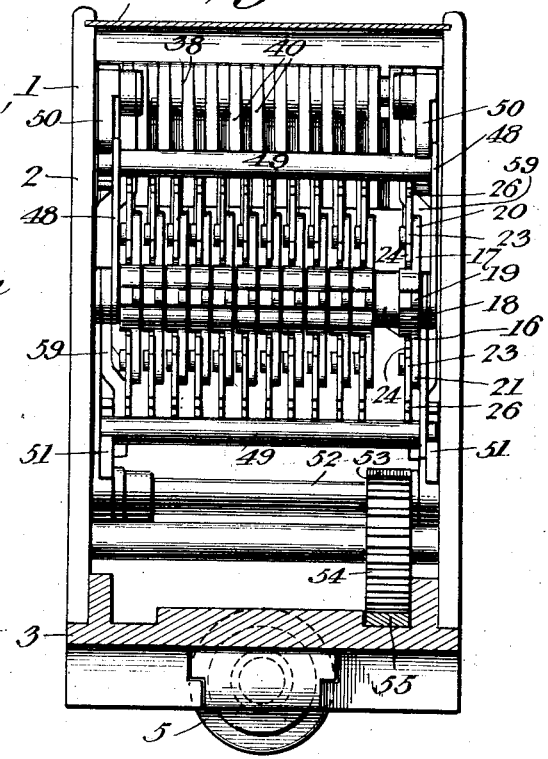
Inventor
*Harry A. Foothorap*
By
Attorney Patented Jan. 5, 1932

1,839,211

UNITED STATES PATENT OFFICE

HARRY A. FOOTHORAP, OF HARRISBURG, PENNSYLVANIA, ASSIGNOR TO ELLIOTT-FISHER COMPANY, A CORPORATION OF DELAWARE

ADDING AND SUBTRACTING REGISTER

Application filed May 3, 1924. Serial No. 710,802.

This invention relates to computing mechanisms, and more particularly to a register or totalizer for writing adding machines.

The principal object of the invention is to embody in a structure of this character transferring or carrying mechanism of simple and inexpensive construction, and which while double acting to make it available for both subtraction and addition, will be operated with a minimum expenditure of power and with a maximum of certainty in both the carrying operation and in the secure locking of the carrying member in accurate position.

Another object of the invention is to provide a double acting or two way carrying mechanism of the motor operated type, so designed that a single set of motor springs will operate the carrying mechanism for either addition or subtraction.

A still further object of the invention is to produce a carrying mechanism of the character specified, having its primary elements forming a toggle so disposed that the carrying mechanism will be self locked in normal position against the considerable power exerted by the carrying motors and will impose a very slight burden on a number wheel or other denominational member to effect the unlocking or tripping of the toggle to permit its operation by the carrying motor.

Another object of the invention is to associate with the carrying mechanism of a register a simple and effective resetting mechanism which will require a minimum of power for its operation to restore the carrying mechanism to normal condition.

To the accomplishment of the objects stated and others subordinate thereto, the invention resides in the embodiment thereof to be hereinafter described, illustrated in the accompanying drawings and succinctly defined in the appended claims.

In said drawings:

Figure 3a is a detail elevation showing the carrying mechanism in a position intermediate of positions shown in Figs. 3 and 4.

Figure 5 is a view similar to Fig. 2, except that the transfer mechanism has been tripped for subtraction.

Figure 6 is similar to Fig. 3 with the same difference.

Figure 7 is a side view of the register with parts broken away and with the transfer mechanism positioned as shown in Fig. 1.

Figure 8 is a transverse section on the line 8—8 of Fig. 1.

Figure 9 is a horizontal section on the line 9—9 of Fig. 1.

Figure 10 is a similar section on the line 10—10 of Fig. 1.

Figure 11 is a section on the line 11—11 of Fig. 1.

Figure 12 is a vertical section on the line 12—12 of Fig. 1.

Figure 13 is a front elevation of the register.

Figure 14 is a detail perspective view of one of the transfer units and Figure 15 is a detail elevation of a portion of the same structure viewed from the opposite side.

Figure 1:
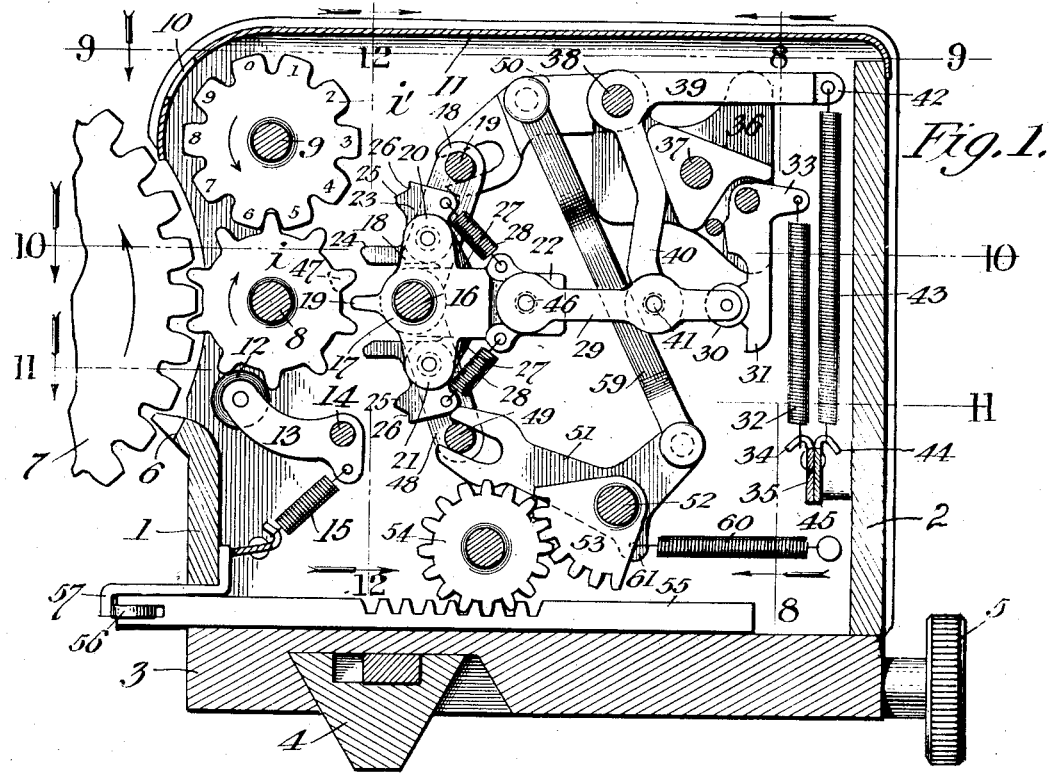
Figure 1 is a vertical sectional view of a register constructed in accordance with my invention.

By way of premise, it may be observed that while the substance of this invention is capable of use in many types of computing machines, all of which include denominational members necessitating the embodiment of transferring or carrying mechanism, the embodiment thereof specifically disclosed in this application for patent is intended for the improvement of the Elliott-Fisher writing adding machine of commerce. In this machine, computing mechanism is associated with writing mechanism in such a way that as the necessary figures in statistical, billing, bookkeeping or other operations are recorded on one or more work sheets the necessary computations will be incidentally effected by one or more computing devices or registers capable of addition or subtraction or both. These registers are located in various positions which appropriate them to various fields or columns of the work and are operated by a master means positioned as to columnar and denominational positions by a moving carriage and operated by digit keys in accordance with the numerical values thereof. Thus, in the type of machine under consideration the depression of a key to record a digit in a given column, will cause a denominational member of the register appropriated to that column and corresponding in denominational value to that of the digit, to be operated to a degree corresponding to the numerical value of the digit and in a direction to add or subtract such value to or from the value already indicated by the register.

The carrying mechanism with which the invention is particularly concerned transfers the value accumulated upon one denominational member to the adjacent member of higher order and positively locates the carried member so that under or over movement thereof is avoided.

The register 1 includes a casing 2 which surmounts a base plate 3 cut out for the reception of the register bar 4 on which the register is adjustably mounted and held by a retaining device or lock 5. The upper edge of the comparatively low front wall of the casing is formed with a guide 6 for the master wheel 7 movable with the carriage (not shown) and disposed to engage any one of a series of denominational members $a, b, c$, etc. These denominational members in the present instance are in the form of toothed wheels carried on a shaft 8 extending across the casing and arranged to be engaged one after another by the master wheel 7 as the latter moves from higher to lower order with the carriage of the machine.

For convenience of observation, a series of indicating wheels $a', b'$, etc. are mounted above the wheels $a, b$, etc. on a shaft 9 and are provided with peripheral digits extending from zero to 9, one digit on each indicating wheel being exhibited opposite a sight opening 10 in the cover 11 of the register casing. The wheels $a, b$, etc. are geared directly to the wheels $a', b'$, etc. so that any movement imparted to a wheel of one group by the master wheel will be transmitted to a wheel of the other group. A series of roller detents 12 engage and yieldingly retain the wheels $a, b$, etc. and are carried by detent levers 13 mounted on a transverse shaft 14 and urged by springs 15.

Directly in rear of the shaft 8 is mounted a transverse shaft 16 on which are mounted a series of transfer devices 17, one for each of the number wheels $a$, except the wheel of highest order which obviously cannot transfer its accumulated value. Each of the transfer devices 17 includes a rocking head 18 formed with a forwardly extending trip 19, a pair of lateral bearing lugs 20 and 21 and a rearwardly extended arm 22 (see Figs. 14 and 15). On each of the lateral lugs is pivoted a combined carrying and locking dog 23 formed with a forwardly extending carrying finger 24 and a forwardly disposed locking lug 25 spaced from the finger and having a recess 26 for the reception of the end of a tooth under conditions to be described. Each of the dogs 23 abuts, as indicated at 27, against the head 18 to hold the dog against yielding in one direction when the carrying finger is in its normal position, while permitting, under certain conditions, a limited swinging movement of the dog in the opposit direction against the resistance of a spring 28.

It will be observed that the springs 28 are connected to the outer ends of the transfer dogs and to the rearwardly extended arm 22 of the head 18. This arrangement serves to yieldingly retain the transfer dogs 23 in normal relation to the head 18 and the possibility of yielding is limited to one direction only. Pivoted to the rearwardly extending arm 22 of the head is the front end of a lever 29 carrying a detent roller 30 at its rear extremity for engagement with a detent 31 urged by a spring 32 having one end secured to the detent, as indicated at 33, and its opposite end retained by a hook 34 bent from a plate 35 fixed to the casing. It will, of course, be understood that a lever 29 and detent 31 is provided for each of the carrying heads.

The detents 31 are mounted in a comb bearing block 36 extended across the casing and secured to the side walls thereof by screws 37, upon the removal of which the block and the various parts assembled thereon may be removed bodily from the casing. Also fulcrumed in the block, as indicated at 38, are a series of bell crank levers 39, on arm 40 of each of which is pivotally connected, as indicated at 41, to one of the links or levers 29, while the other arm 42 extends rearwardly and is terminally connected to one of a series of vertically disposed motor springs 43 having their lower ends connected to hooks 44 bent from a plate 45.

It will now be noted that the head 18 and lever 29 of each carrying or transfer device constitute in effect a toggle, since the movement of the head on its axis is necessarily accomplished by a lateral breaking of the joint 46. Normally, however, the axes of movement are all in alignment so that the force exerted by the motor spring 43 is sustained by the fixed shaft 16, the arcuate movement of the joint 41 being substantially horizontal or at right angles to the arcuate movement of the joint 46.

We are now in a position to consider the operation of the carrying mechanism, and as each of the carrying devices of the series is similar to the others a description of the operation of one carrying device will suffice. With the parts in normal position, as shown in Fig. 1, the trip 19 is disposed intermediate of two teeth of one of the wheels but in an offset position between two wheels so as not to interfere with the rotation of the adjacent wheel until, in the process of addition, the numeral 9 is opposite the sight opening 10. When this occurs, a carrying lug 47, which is merely a widening of one of the teeth of the wheel, will be in the position shown in Fig. 1. The next movement of the wheel will cause the trip lug to engage the trip 19 and move the same laterally, thus swinging the head 18 of the carrying device so as to move the joint 46 out of alignment with the two end axes 16 and 41 of the toggle. As soon as this aligned or locking relation of the toggle members is disturbed by the application of only sufficient force to overcome the slight resistance of the detent 31, the motor spring immediately becomes effective to flex the toggle because the direct resistance of the shaft 16 to the operation of the motor spring is removed the instant the axis 46 moves out of line with the axes 16 and 41. As soon, therefore, as a wheel moves the trip 19 very slightly, the motor spring comes into action both to overcome the resistance of the detent and to swing the head 18 of the carrying device with the shaft 16 as an axis. This swinging movement of the head will press one of the carrying fingers 24 against a tooth of the number wheel of next higher order, and as the movement continues under the impulse of the motor spring, will carry or advance such next higher wheel one step or increment of movement.

Figure 2:
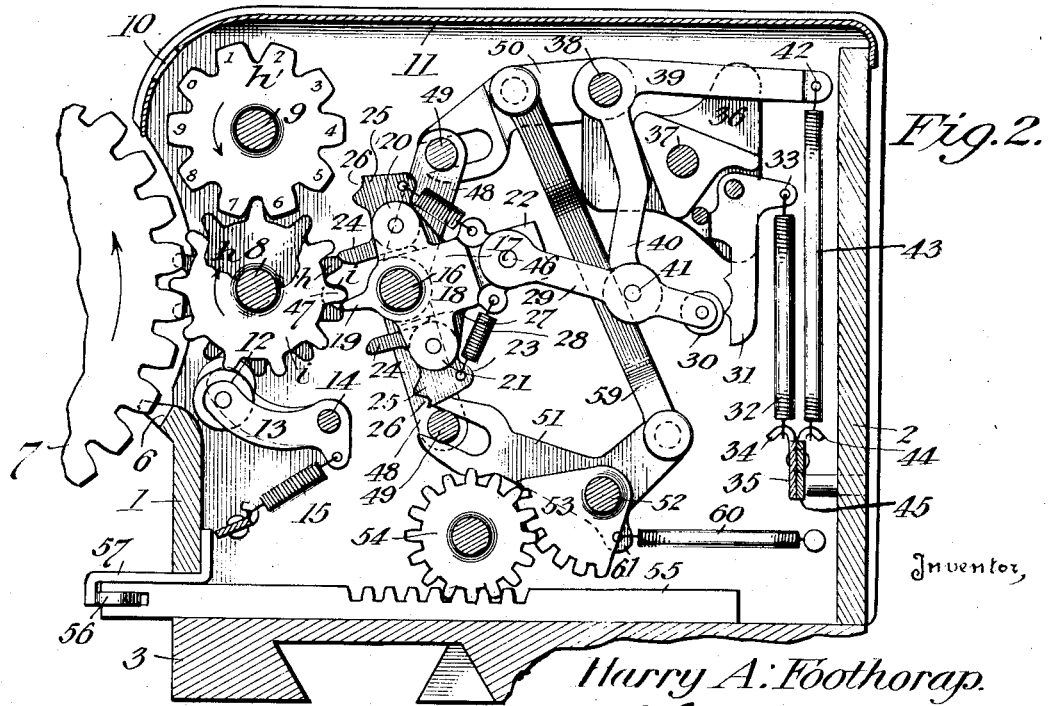
Figure 2 is a similar view showing the transfer toggle broken or tripped by a number wheel and about to operate to advance or carry the number wheel of next higher order.
Figure 3:
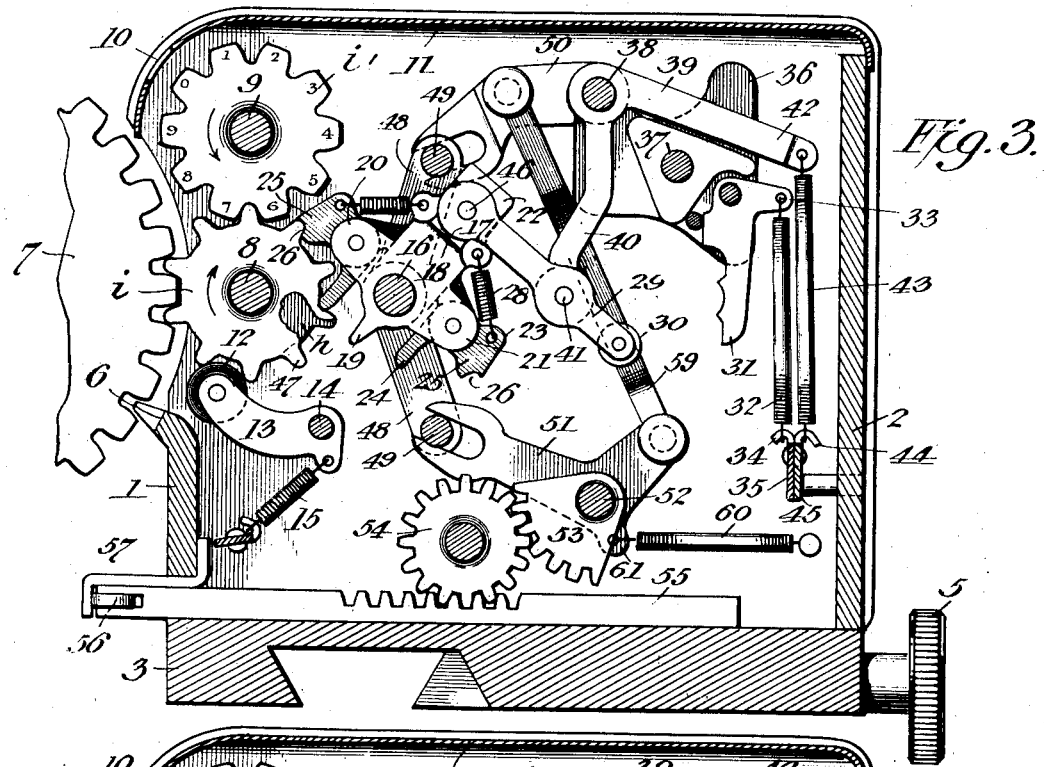
Figure 3 is still another view of this character with the carrying mechanism fully operated to carry and lock the wheel.

In Figure 2 is shown the positions assumed by the parts when the wheel to be carried has been engaged by the carrying finger. As the movement of the wheel which has tripped the carrying device continues under the impulse of the master wheel, the trip lug will move out of engagement with the trip but the movement of the carrying device will continue until the carried wheel has been advanced a full increment, where it will be locked against movement in either direction by the carrying finger engaging the rear of a tooth and by the locking dog associated with that finger engaging the front of another tooth of the same wheel. It will thus be seen that as the wheel to which a carrying movement is imparted reaches the proper limit of its movement it is arrested and locked with certainty against movement in either direction so that all possibility of under or over operation is avoided with certainty. The positions assumed by the parts at the completion of the carrying operation for addition is shown in Fig. 3.

The detents 12 also assist in the accurate location of the wheels, whether moved by the master wheel or by the carrying devices, and serve to retain the wheels with their teeth in accurate alignment. These detents also serve to prevent the wheels from moving out of position when the carrying devices are retracted, since it will be obvious that when a carrying device is reset to normal position the locking dog and carrying finger will both be withdrawn from the wheel. Furthermore, it will be noted that this movement of the carrying finger with the head will cause it to engage an adjacent tooth of the wheel. It is for this reason that provision is made for allowing the finger to yield slightly in one direction which it does against the resistance of its spring 28 (see Fig. 3a) so that the finger will clear the tooth without necessitating movement of the wheel. When carrying for subtraction the behavior of the mechanism is exactly the same as described for addition, except that the movement is in the reverse direction.

The movement of a wheel from "0" to "9" serves to subtract one from the number wheel of next higher denominational order. The subtracting operation is clearly shown in Figs. 5 to 7.

Figure 4:
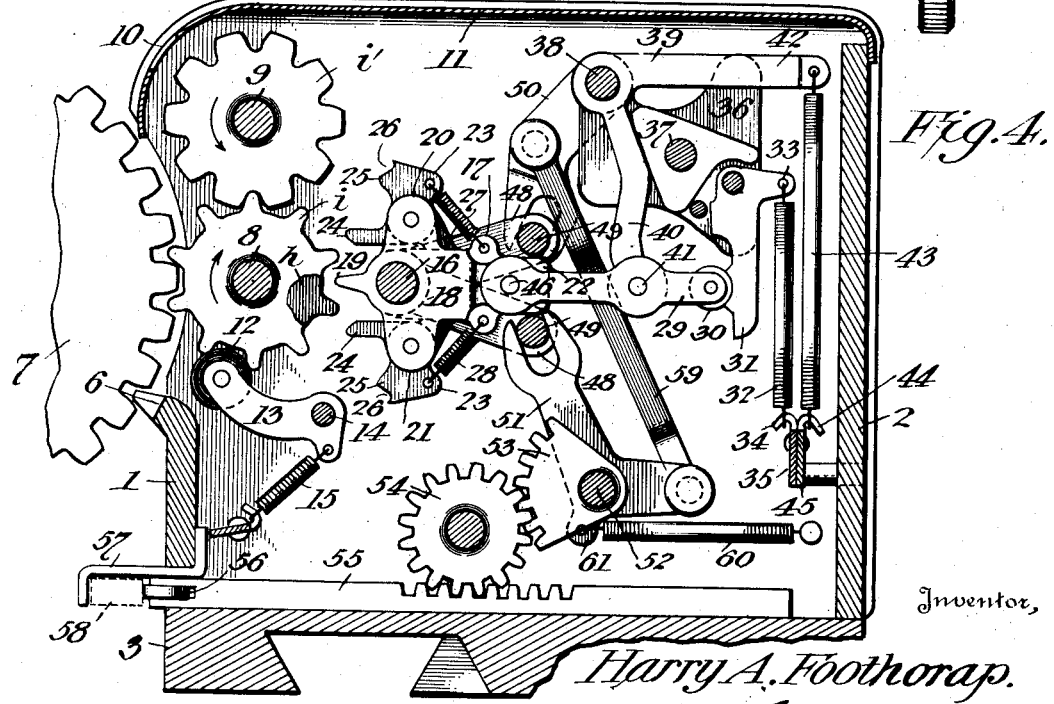
Figure 4 is a view of this kind showing the carrying mechanism returned to normal position by the resetting mechanism and before the resetting mechanism has returned to its normal position.

The resetting of the carrying mechanism to normal position is effected by a pair of resetting yokes 48, the end members of which are swung from the shaft 16 beyond the opposite ends of the series of carrying devices, the transverse members of the yokes constituting resetting bars 49 which upon the operation of the yokes engage and return any carrying device that has been operated. These bars are engaged by the bifurcated ends of upper and lower operating levers 50 and 51. The upper levers are of the second class, being fulcrumed on the shaft 38, and the lower levers are of the first class, being afforded a fulcrum by a shaft 52 and operated by a segment 53 geared to a pinion 54 meshing with a resetting rack 55 slidably mounted at the bottom of the casing and extended beyond the front wall thereof for actuation by a reset cam mounted on the carriage of the machine. At its front extremity the slide 55 is provided with an antifriction roller 56 and a fixed guide 57 is carried by the casing to constitute a backing for the cam 58 (indicated in dotted lines in Fig. 4) as it moves back with the carriage to operate the reset rack. The rear ends of the levers 51 are connected by links 59 to the levers 50 at a point intermediate of the ends of the latter, the arrangement being such that the operating levers 50 and 51 when swung by the rack 55 through the intermediate gearing will move in opposite directions, since obviously the reset yokes must swing toward and from the aligned position of the carrying devices. The resetting mechanism is retracted by springs 60 attached to the casing and to short arms 61 of the levers 51.

It will now be obvious that when the carrying devices have been operated, whether for addition or subtraction, and occupy either the position shown in Fig. 3 or that shown in Fig. 6, they may be retracted to normal position or reset against the resistance of the motor springs 43 by retracting the reset slide or rack 55 which through the intermediate gearing will swing the operating levers 50 and 51 to cause the rearward swinging of the yokes 48 so that one or the other of the resetting bars 49 will engage the displaced carrying devices and swing them back to that aligned position which they have been described as being normally locked. This operation having been effected and the cam 58 having moved past the slide 55, the resetting mechanism will be restored to the normal position, shown in Fig. 1, by the springs 60 and the mechanism will again be in condition for either an adding or subtracting operation of the register.

It will be observed that this carrying mechanism includes members which normally occupy what may be described as a locking relation inasmuch as the true alignment of the head 18 and the member 29 would theoretically nullify the action of the motor springs and the parts would remain in normal position. The provision of the detent 31 represents a margin of safety, opposing as it does, limited resistance to such slight lateral movement as would overcome a true dead center and permit the motor springs to become effective. Also, it will be noted that this mechanism is characterized by carrying devices, which while normally locked in a central position by the relation of their members, are capable of operating either for addition or subtraction under the impulse of the same springs or motors, a single set of motor springs being required to operate the carrying devices for either addition or subtraction according to the direction in which the carrying devices are tripped or flexed by number wheels rotating in one direction or the other. Furthermore, it will be noted that the resetting mechanism upon each operation will reset any or all of the carrying devices, regardless of the direction in which they may have operated, since these devices will be restored to the normal central position from any position which they are capable of occupying. As heretofore stated, the mechanism described is particularly designed for use in writing adding machines but it is obvious that both the carrying mechanism and the mechanism for reseting the carrying mechanism is susceptible of use in any type of machine embodying denominational members upon which value is accumulated and carried or transferred regardless of the form of such members, the means for imparting movement thereto or whether they are used for addition or subtraction or both.

Therefore, while the illustrated embodiment of my invention appears at this time to be preferable, I wish to expressly reserve the right to effect such variations or modifications thereof as may come properly within the scope of the protection prayed.

What I claim is:

1. The combination with denominational members, of carrying mechanism operative to effect a transfer from one member to the other and including a series of two way carrying devices, a pair of resetting yokes arranged to restore the carrying devices to normal position, levers of different class connected to the yokes, a link connection between said levers to compel their simultaneous movement in opposite directions, and means for swinging said levers.

2. The combination with denominational members, of carrying mechanism operative to effect a transfer from one member to the other and including a series of two way carrying devices, a pair of resetting yokes arranged to restore the carrying devices to normal position, levers of different class connected to the yokes, a link connection between said levers to compel their simultaneous movement in opposite directions, a resetting slide and gearing between the reset slide and said levers.

In testimony whereof I hereunto affix my signature.

HARRY A. FOOTHORAP.